United States Patent Office 3,526,288
Patented Sept. 1, 1970

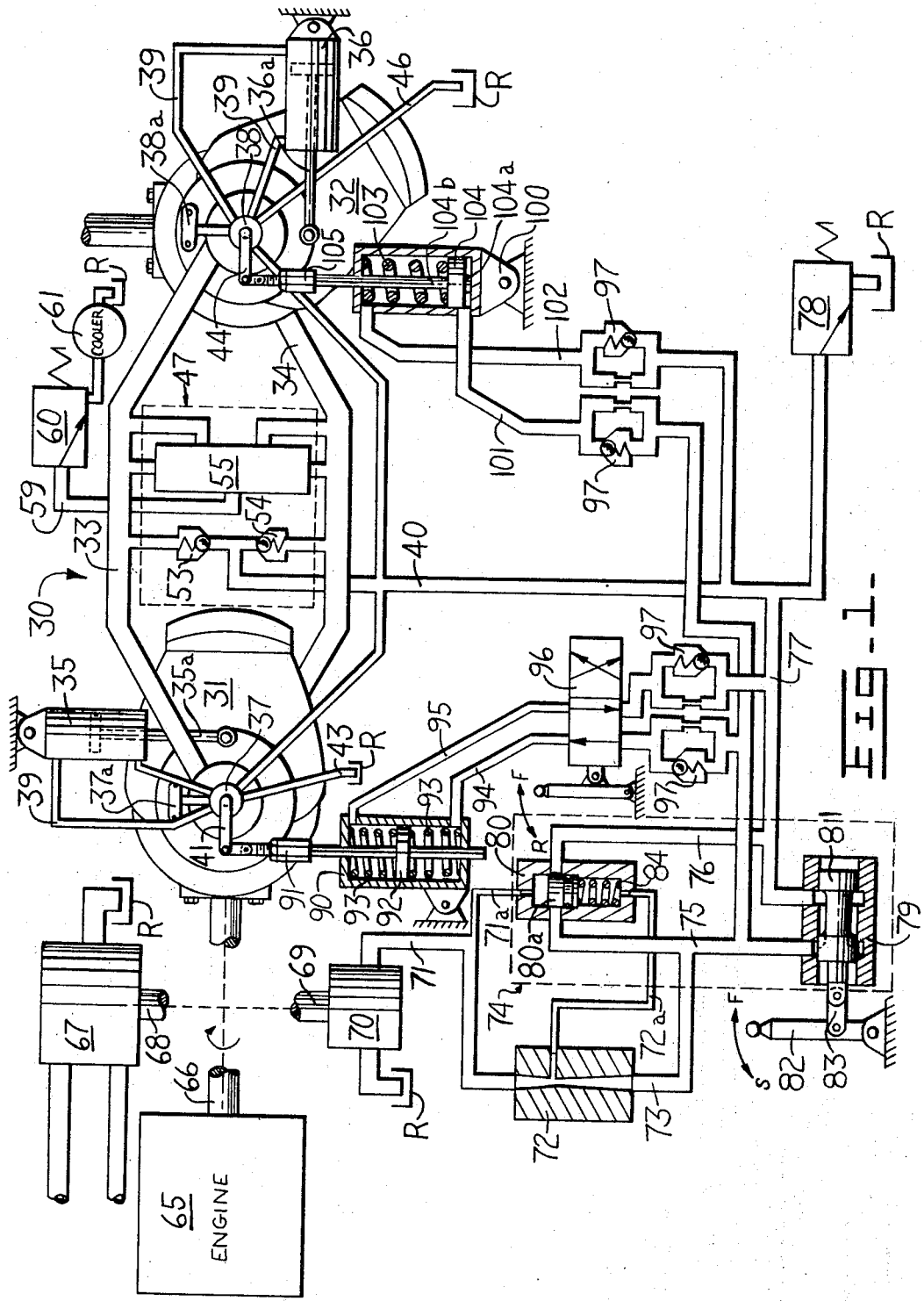

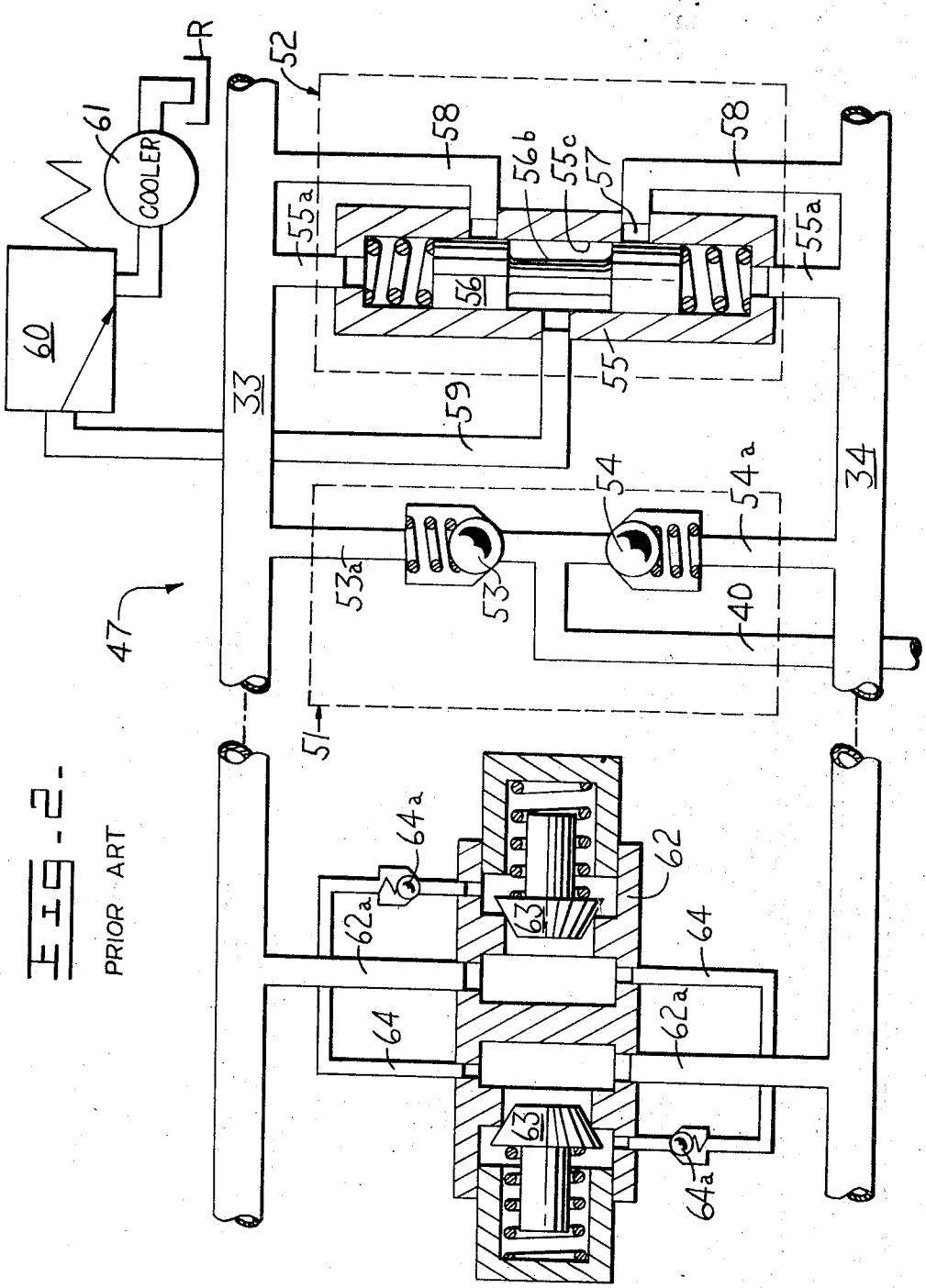
Fig-2- PRIOR ART

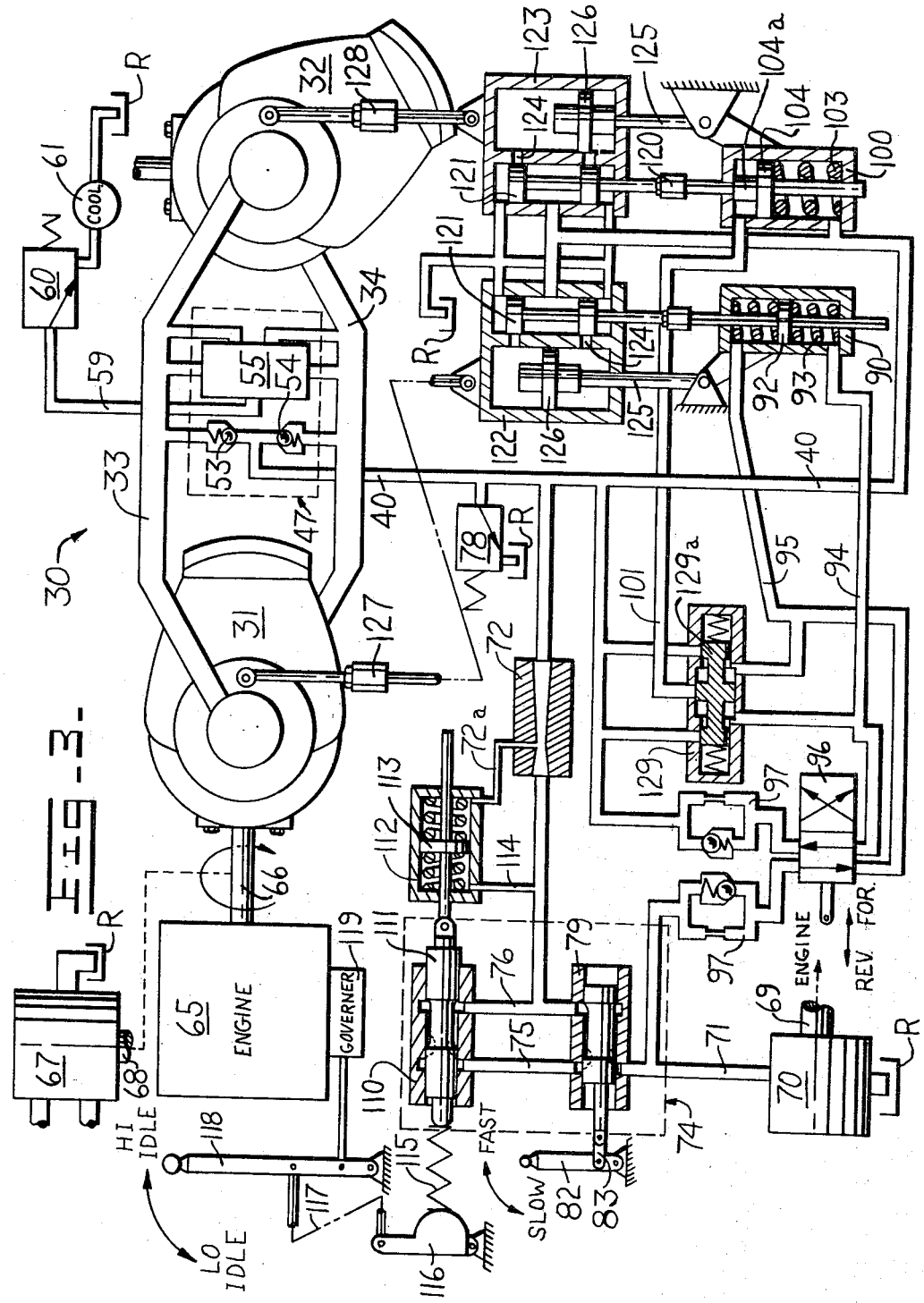

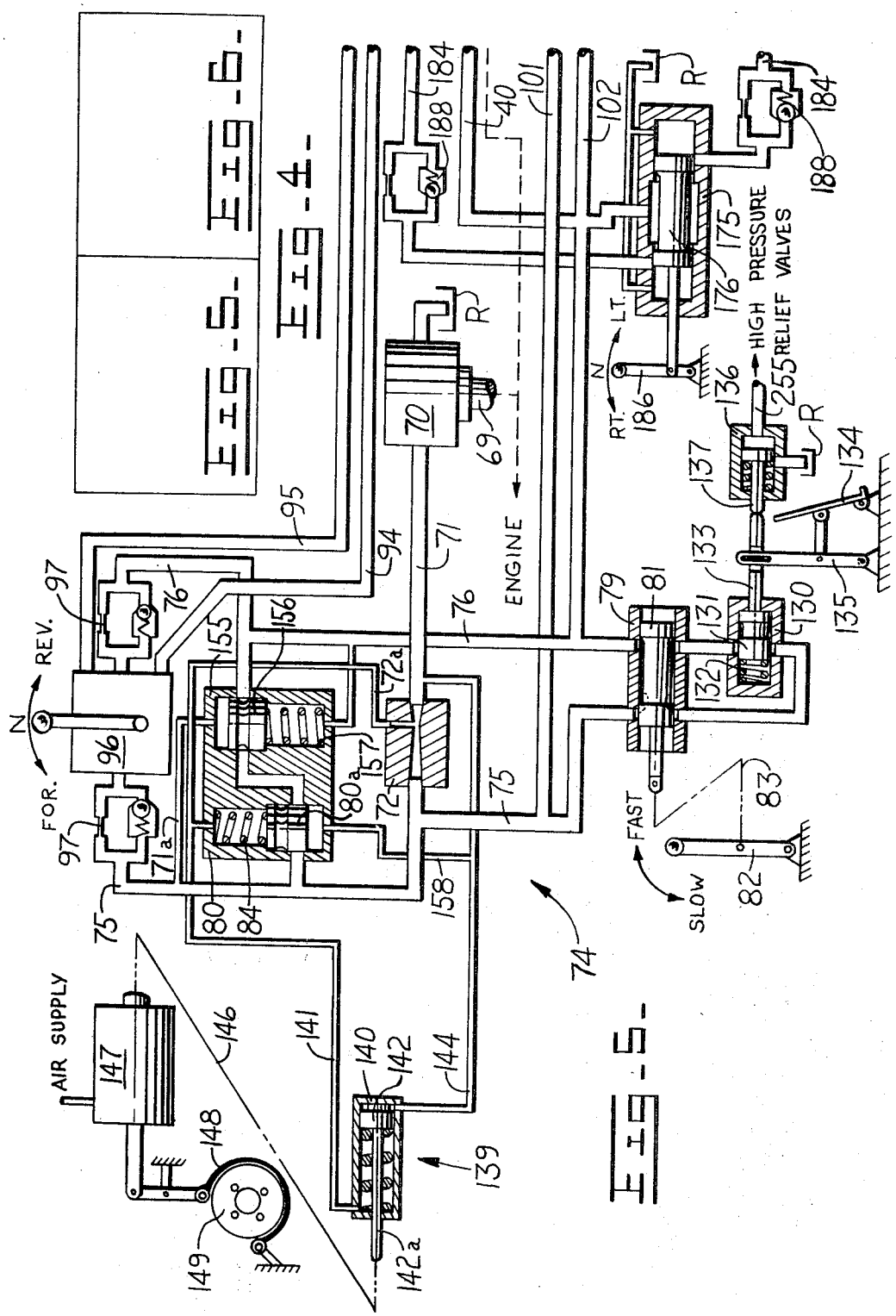

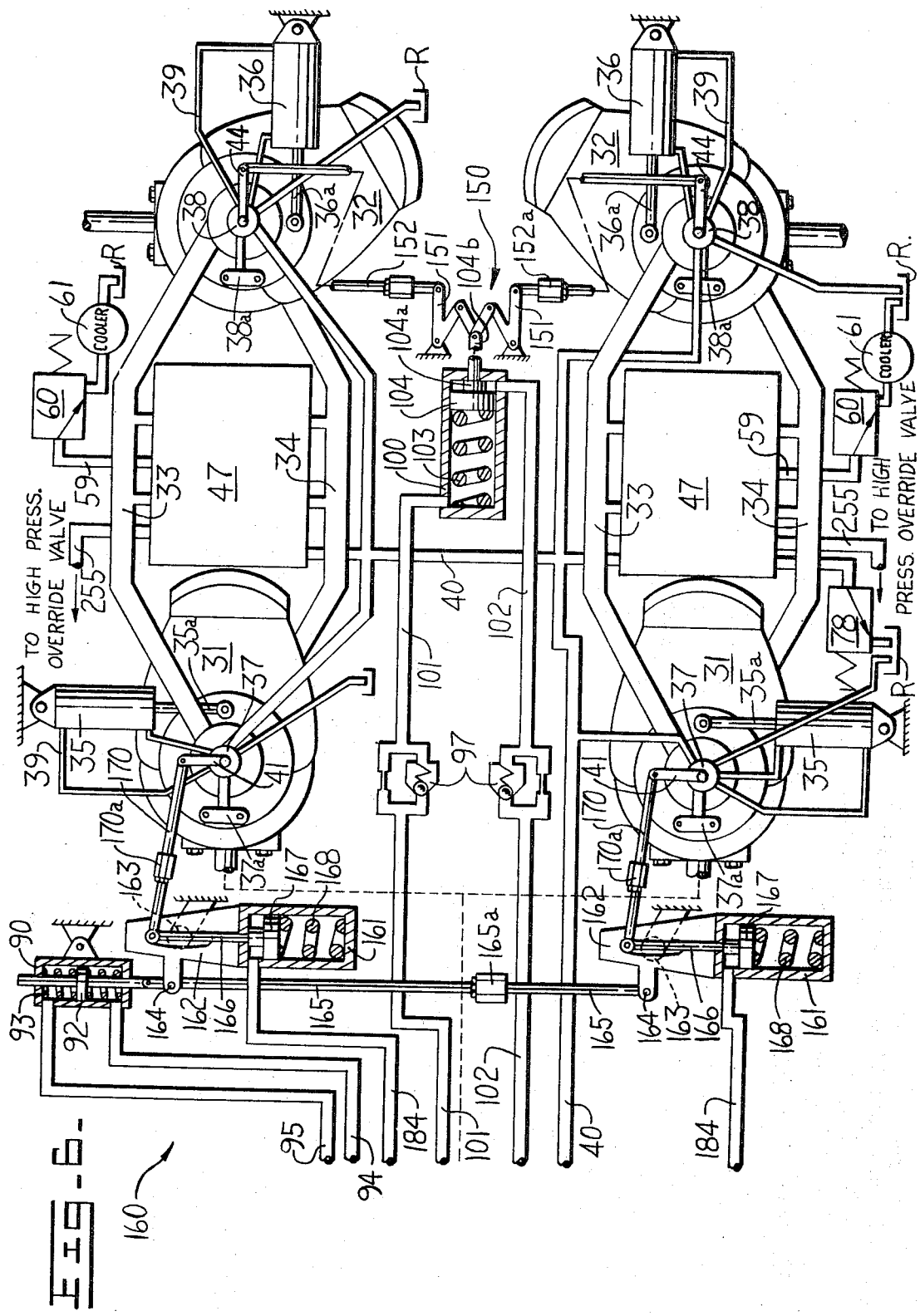

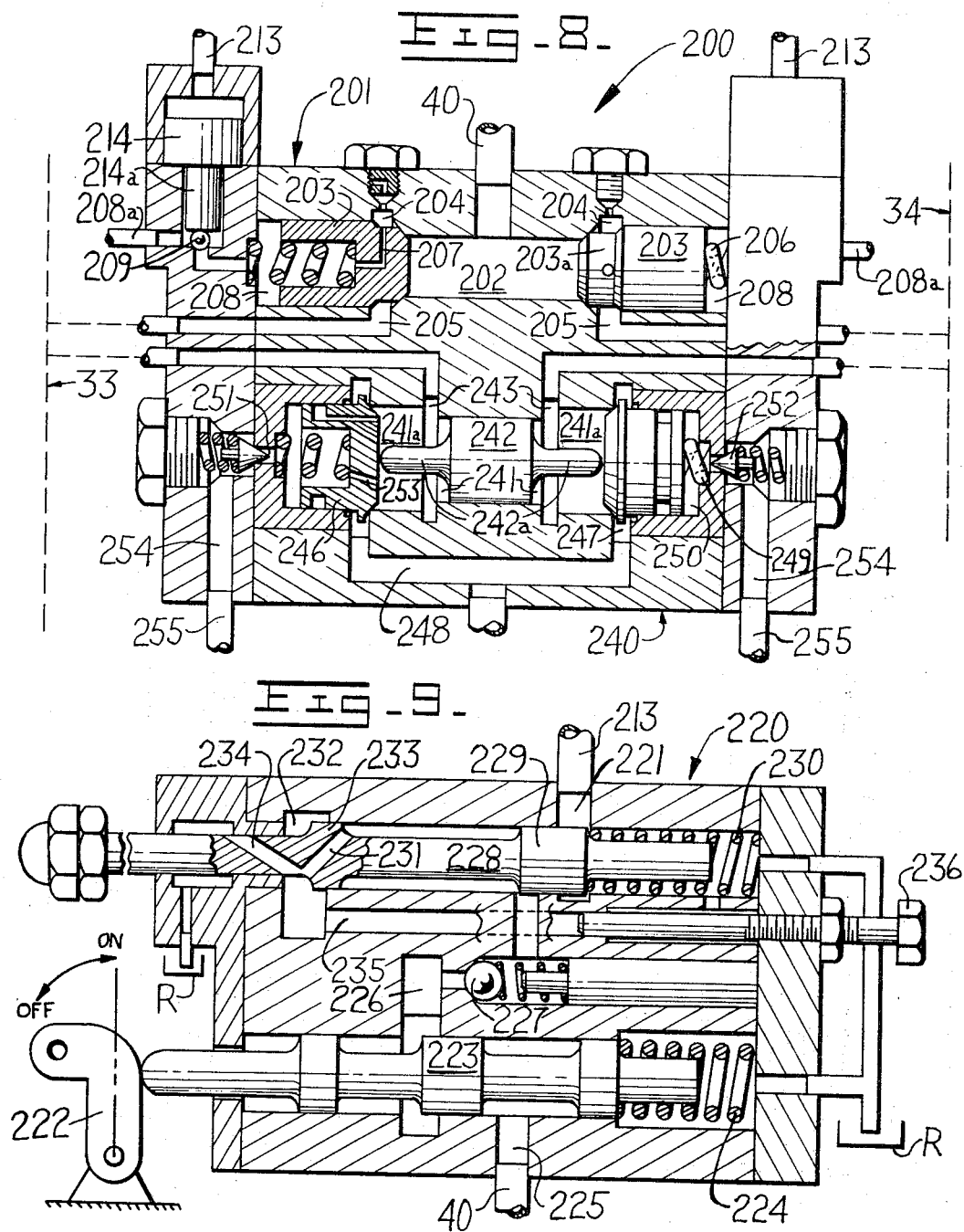

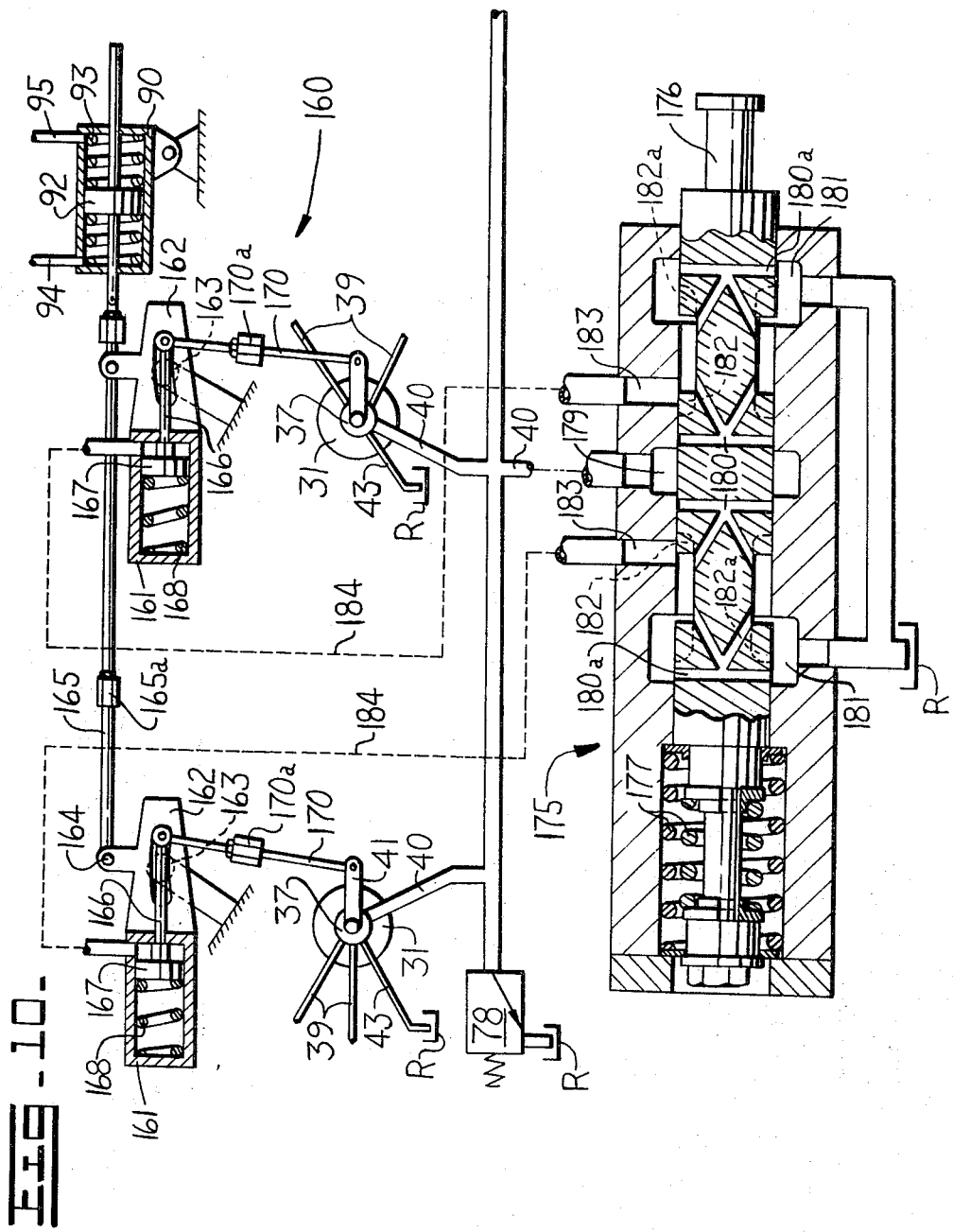

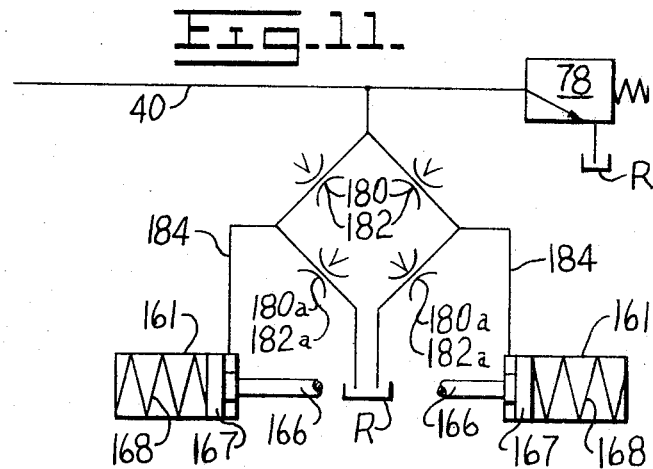
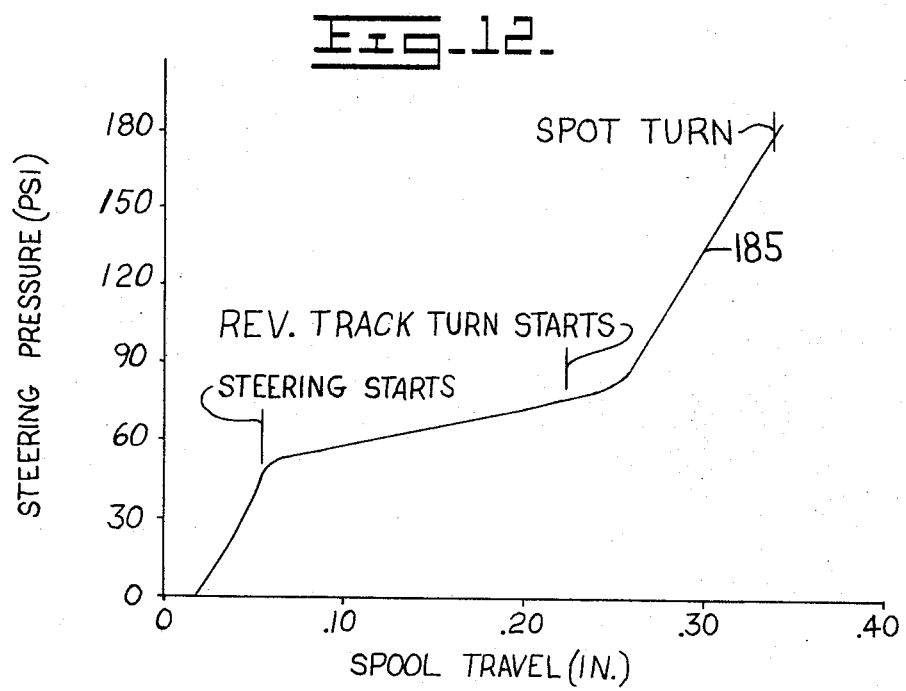

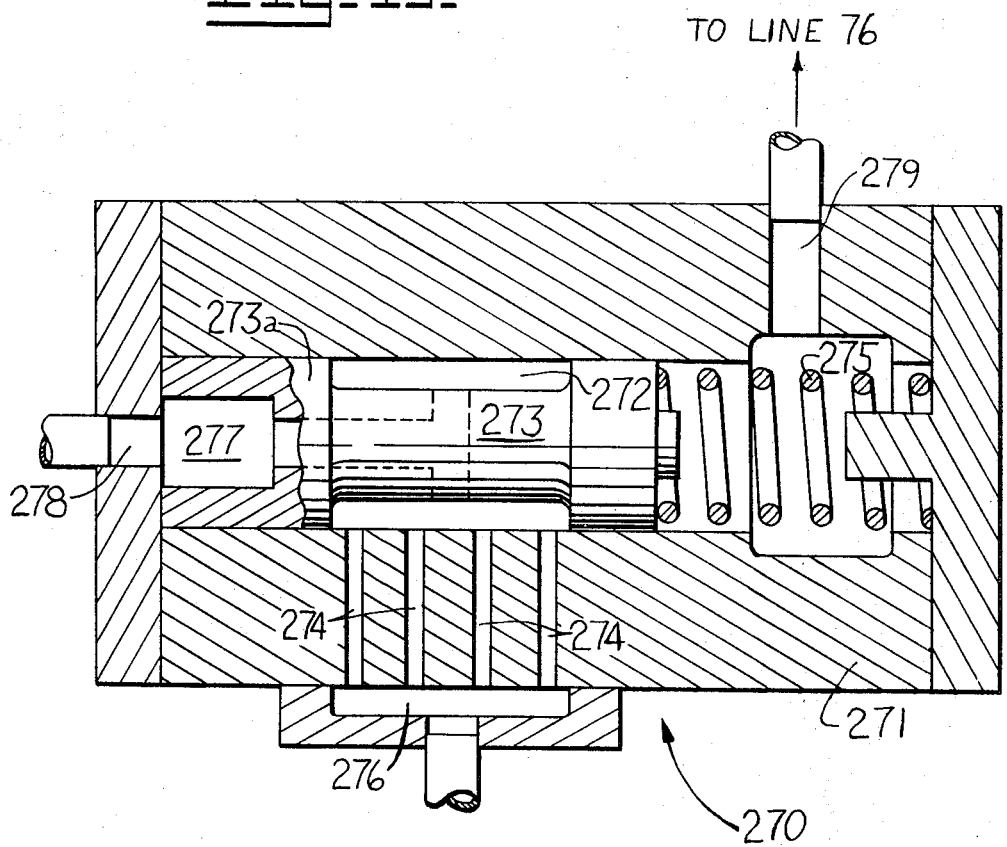

3,526,288
HYDROSTATIC TRANSMISSION CONTROL SYSTEM
John R. Cryder, Joliet, Willard J. Haak, John L. Hufeld, and Lionel L. Kinney, Peoria, Kenneth R. Lohbauer, Joliet, and Howard A. Marsden, Pekin, Ill., Ralph W. Matthews, Franklin, Wis., and William B. Norick, Joliet, Glen E. Stewart, Springfield, Rollin P. Vanzandt, Peoria, and Frank H. Winters, Joliet, Ill., assignors to Caterpillar Tractor Co., Peoria, Ill., a corporation of California
Original application June 14, 1967, Ser. No. 645,912, now Patent No. 3,477,225, dated Nov. 20, 1969. Divided and this application Aug. 2, 1968, Ser. No. 763,462
Int. Cl. B62d 11/04
U.S. Cl. 180—6.48                                    3 Claims

ABSTRACT OF THE DISCLOSURE

Hydrostatic transmission systems, which transmit torque via fluid pressure circulating between a pump and motor, are now sufficiently perfected for use in work vehicles. Infinitely variable input to output ratios are available in such transmissions which make them especially useful in tractor type vehicles. However, for high efficiency the transmission ratio must be properly and continuously adjusted for maximum performance. Such control is accomplished in this invention by employing a separate control pump geared to the transmission power source, a valve controlled differential pressure stack connected to receive the output of the control pump wherein changes in its valve position will effect changes in pressure differential ocurring within the stack, pressure responsive means having elements displaceable by pressure differential connected to the stack so that pressure differentials occurring therein are communicated to the elements and linkages connecting the elements with control means in the transmission for changing its ratio. Also included is a flow sensitive system which is connected across the differential pressure stack to reduce the pressure differential if the output of the control pump drops due to a decrease in engine speed. The basic control system can be employed with a variety of subsystems to provide steering in track-type vehicles, reversing and the like.

This is a divisional application of U.S. application Ser. No. 645,912, filed June 14, 1967, now Pat. No. 3,477,225.

BACKGROUND OF THE INVENTION

Advances in the technology of hydraulic translating devices (hydraulic pumps and motors) now allow hydrostatic transmissions to be employed in vehicles having high drawbar horsepower requirements. With its infinitely variable speed ratio between the engine and the ground speed of the vehicle the hydrostatic transmission offers the ability to obtain the maximum drawbar horsepower over the vehicle's full speed range. An early hydrostatic tarnsmission for a track-type vehicle is disclosed in U.S. Pat. No. 2,036,437 issued to Ruediger, but at that time the technology of translating units was not perfected sufficiently to bring it to reality.

With the new translating devices now available, the limited gear steps in work vehicles, associated clutching, shifting, braking and engine acceleration and deceleration, may become a thing of the past. Translating devices suitable for hydrostatic transmissions in work vehicles are disclosed in copending application Serial No. 564,875 entitled "Hydrostatic Apparatus," now U.S. Pat. No. 3,388,472, wherein many of the advantages of hydrostatic transmissions are noted.

For a hydrostatic transmission to have a broad speed range without large pump and motor units, it is necessary that the displacement of both its pump and motor be varied in displacement. This avoids the need for both high and low speed motors, such as disclosed in U.S. Pat. 2,541,290 issued to Robinson, or unduly large translating units to obtain the desirable speed ranges.

Hydrostatic transmissions in which both the pump and motor are variable displacement units present a speical probelm in control since the changes in displacement of the pump and motor relative to one another should be properly sequenced for efficient operation and to provide desirable torque ratio characteristics in the transmission. Ina properly sequenced transmission, the pump will have zero displacement at a zero speed condition, and the motor will be at its maximum displacement. For acceleration of the vehicle, the pump is increased in displacement toward a maximum displacement, while the motor remains at its maximum displacement so it will develop maximum torque at minimum presures for accelerating the vehicle.

After the pump reaches its maximum displacement, the vehicle is at maximum speed unless the displacement of the motor is variable. Then even with small size translating units, a broad speed range is obtained by decreasing the displacement of the motor to further increase the speed of the vehicle with such a transmission.

Also, these transmissions in a vehicle should be properly sequenced from a high speed to a lower speed, somewhat similar to downshifting a conventional transmission. Thus, for a speed decrease from maximum transmission speed, the motor displacement is first increased to its maximum to initially slow the vehicle and thereafter the pump is moved toward its zero displacement to further retard vehicle speed.

If proper sequencing is not employed desirable torque ratio characteristics are lost with an accompanying decrease in transmission efficiency; operation of the transmission may become rough in some modes; retarding (braking) action through the transmission is reduced during deceleration; and unnecessary high pressures will be developed in the transmission.

Some control systems for hydrostatic transmissions have been designed which sense the pressure in the fluid loop connecting the pump and motor and use this pressure to control the transmission. However, those types of control systems are not satisfactory since, in many cases, the engine driving the transmission must also power mounted or towed implements which make power demands on the engine, without changing the pressure in the hydrostatic loop. Further, loop pressure can vary independent of engine load.

Accordingly, it is a purpose of this invention to provide a simple but reliable control system for hydrostatic transmissions which is capable of sensing the total load on an engine and automatically adjusting a hydrostatic transmission for maximum output in relation to the power available.

Another purpose of this invention is to provide a control system for paired hydrostatic transmissions in track-type vehicles wherein the transmissions can be independently controlled for steering the vehicles.

Also, it is a purpose of the invention to provide complementary components for the basic control system which increase its flexibility and improve its performance.

SUMMARY

Briefly, the above purposes and advantages as well as many others, can be accomplished in a basic control system for a hydrostatic transmission comprising a positive displacement control pump geared to the prime mover driving the transmission, a venturi means connected to the pump so the output of the pump passes therethrough, a differential pressure control stack also connected so the output of said control pump passes therethrough, a manually adjusted valve in said differential pressure stack for controlling the differential pressure in the stack, biased valve means associated with the venturi means and connected across said differential pressure stack operable to reduce the differential pressure in the stack when the engine speed decreases under load, pressure reciprocated pilot means connected to said stack and having a movable element therein which changes position in response to the differential pressure in the stack, and linking means connecting said element to the servo-units in the transmission for controlling displacement of translating units, and thus, transmission ratio.

BRIEF DESCRIPTION OF THE DRAWINGS

FIG. 1 diagrammatically illustrates the basic control system associated with a hydrostatic transmission;

FIG. 2 illustrates a known relief and replenishing group plus a high pressure relief system for the hydrostatic transmission shown in FIG. 1;

FIG. 3 diagrammatically illustrates a modification to the basic control system shown in FIG. 1 which provides variable engine speed compensating means for the control system and linear servo systems for transmission ratio control, along with sequence system valves for forward-reverse shift;

FIG. 4 is a block diagram showing the relationship between FIGS. 5 and 6;

FIG. 5 shows part of the control system when employed for dual hydrostatic transmission systems in track-type vehicles with provisions for steering;

FIG. 6 discloses the complementary parts of the control system shown in FIG. 5 and also the transmission units;

FIG. 8 illustrates a relief and replenishing valve unit which is employed with the integrated control system shown in FIGS. 5 and 6, providing additional control features in the system;

FIG. 9 illustrates a safety valve system which cooperates with the relief and replenishing valve shown in FIG. 8 to deactivate the transmission for operator safety;

FIG. 10 diagrammatically illustrates a steering control system employed with track-type vehicles using dual transmissions as shown in FIGS. 5 and 6;

FIG. 11 shows schematically a hydraulic circuit for the steering control system of FIG. 10;

FIG. 12 graphically shows the proportion between control movement and response of the steering circuit; and FIG. 13 illustrates a variable orifice for flow device which can be used in place of simple ball checks and parallel orifice units in more sophisticated control systems for smooth transmission response.

DESCRIPTION OF EMBODIMENTS

Figure 7:
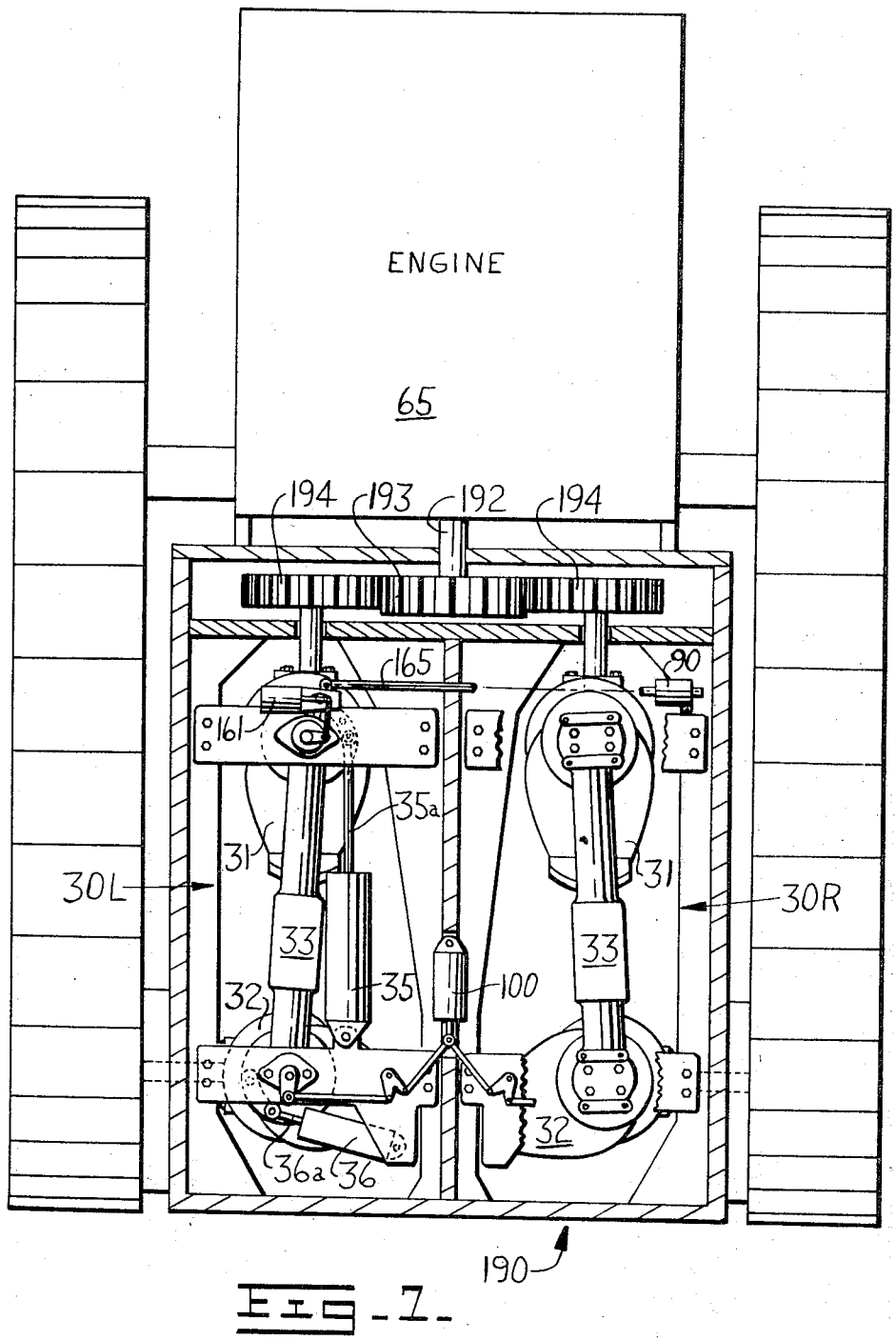
FIG. 7 shows the dual transmissions shown in FIG. 6 mounted in a track-type vehicle.

In understanding the control system it is helpful to associate it with a hydrostatic transmission. Therefore, FIG. 1 illustrates the control system with a hydrostatic transmission 30 having a variable displacement pump 31 and motor 32 connected together in a hydraulic loop circuit composed of an upper conduit 33 and a lower conduit 34. "Upper" and "lower" with reference to the conduits are merely for convenience and not indicative of position or structure.

The transmission illustrated in the drawings uses variable displacement translating devices which are illustrated in copending application Ser. No. 564,875 entitled "Hydrostatic Apparatus" having a common assignee. These particular translating units are suitable for high-pressure operation since the hydrostatic loop is completely rigid with the conduits 33 and 34 joined directly to rigid trunions which extend completely through these units. This forms a very rigid transmission structure.

For actuation of the transmission the units are swung about their trunnion to change the displacement. Pump actuator 35 through its rod 35a swings the pump for changes in displacement with motor actuator 36 swinging the motor about its trunnion via rod 36a. The pump actuator is controlled by the pump rotary servo unit 37, while the motor actuator is independently controlled by a separate motor rotary servo 38. These servo units are mounted adjacent to the pump or motor which they are controlling so that follow-up linkages 37a and 38a can be connected to them for controlling position correspondence in the servo units. Hydraulic lines 39 connect the respective actuators with their associated rotary servo.

The rotary servo valve units can be of a conventional type, such as shown and described in the U.S. Pat. No. 1,773,794 issued to Schneider, and control the flow of pressurized fluid from line 40 to their associated actuator in order to change the pump or motor displacement. A pump servo control arm 41 positons the pump servo, which in turn allows fluid to flow to actuator 35 until the pump position has swung sufficiently that follow-up bracket 37a repositions parts of the servo to stop the flow of fluid when "position correspondence" is achieved. During movement of the actuator fluid is drained from the unpressurized end of the actuator to reservoir via the servo unit and drain 43.

Motor rotary servo unit 38 operates in the same manner, thus motor servo control arm 44 will change displacement of the motor by allowing pressurized fluid to flow from line 40 to the actuator 36 via line 39 until such time as follow-up bracket 38a has repositioned the servo unit to stop fluid flow at "position correspondence." Fluid from the unpressurized side of the motor actuator is drained to reservoir via the servo and drain 46.

It should be appreciated that the particular translating units illustrated are not intended to limit the invention, and that other types of fluid translating units, such as those shown in U.S. Pat. 3,274,946 issued to E. E. Simmons, could be employed and controlled by the servo control units associated with the control system.

In most hydrostatic transmissions leakage is not sufficient to allow enough make-up fluid to be added to the fluid loop for cooling purposes. Thus it is necessary to utilize a relief and a replenishing group 47 (enclosed in broken lines), such as shown in FIG. 2, so some of the fluid can be removed from the loop and make-up fluid added for cooling the transmission. Operation of such a group is discussed in order that a fully integrated control system according to this invention may be understood.

In FIG. 2 a prior art relief and replenishing group 47 with a high-pressure relief is illustrated. In a hydrostatic transmission either the upper or lower conduit 33 or 34 may be operated at a higher pressure, as the working side of the loop, depending upon the power flow through the transmission. Thus the relief and replenishing group must be able to remove and add hydraulic fluid from either side of the loop (conduit 33 or conduit 34). Typically this is accomplished by two separate sections in the relief and replenishing group, which, for convenience, can be designated as replenishing section 51 and the fluid relief section 52 (outlined with broken lines).

In the replenishing section two spring-biased ball checks 53 and 54 are in communication with conduits 33 and 34, respectively, through stub pipes 53a and 54a. These checks, illustrative of type of checks which can be employed, are arranged so that pressurized fluid from line 40 can pass through one or the other check valve into the hydraulic loop, providing a positive pressure in the conduit operating at the lower pressure, preventing pump cavitation and adding cool fluid to the loop. The higher pressure in the conduit operating as the working side of the loop will close its associated ball check so that power will not be lost by flow of pressurized fluid therethrough.

The replenishing fluid from line 40 is precooled in order to provide transmission cooling, and the fluid relief section 52 is used to remove fluid from the loop so that a greater amount of cool replenishing fluid can be added through ball check valves. Hydraulic fluid in the loop is removed through the relief fluid dump valve 55 subsequent to circulating through the motor. The dump valve is connected between the conduits 33 and 34 with short pipes 55a. A spring centered spool 56 in this valve is arranged so its opposite ends are in communication with the pressurized fluid in conduits 33 and 34 via the stub pipes. Normally this spring centered spool will remain in a neutral positon until either conduit 33 or 34 operates at a higher pressure, at which time it will be displaced in a direction to open a port 57 communicating with the conduit operating at the lower pressure. As this occurs a reduced center portion 56b will open a flow passage through one of the tap conduits 58 on the main loop, through chamber 55c, conduit 59, relief valve 60 and cooler 61 reservoir. Opening this path allows additional fluid to be removed from the loop subsequent to passing through the motor so that a greater amount of replenishing fluid can be introduced through one of the ball check valves, as previously noted.

Also, it is desriable to incorporate an overpressure relief valve system 62 in the loop of a hydrostatic transmission. In FIG. 2 such a system is connected between conduits 33 and 34 with short connecting conduits 62a. These short conduits communicate with separate chambers which are closed by a spring-loaded poppet valve 63 whose bias is adjusted to control the maximum pressure in the loop. The chamber behind each poppet is connected with the short conduit 64 with the chamber closed by the opposite poppet so that when over-pressure occurs displacing one of the poppets, fluid can vent from one side of the loop directly to the opposite side, bypassing the motor. A ball check 64a in conduit 64 prevents reverse flow in each line.

The above description covers a typical hydrostatic transmission and its components with which the novel control system of this invention is employed. From the above discussion, it can be appreciated that the control system must cooperate with the servo-control units of the pump and motor in order to achieve proper sequencing of the transmission.

Normally such a transmission as described above will be directly driven by an engine 65, through shaft 66, as illustrated in FIG. 1. It is not necessary, though optional, to have a clutch between the engine and the pump since the pump can be positioned for zero displacement to neutralize the power flow in the transmission without disconnecting the pump. The engine also drives the implement pump 67 through shaft 68, which also makes power demands on the engine during operation of vehicle-mounted or towed implements.

The control system of this invention is designed to properly sequence a hydrostatic transmission, like the one described above, under all conditions of load. It automatically adjusts the transmission for the maximum power output consistent with power available from the engine within a manually set speed range.

As previously noted, the control system includes a positive displacement pump geared to the engine 65, a venturi means connected to receive the flow of the pump, a differential pressure stack also connected to receive the flow of the pump, a manually adjusted valve in the differential pressure stack for controlling the pressure differential, biased valve means associated with the venturi connected into the stack which also controls the differential pressure therein in response to changes in engine speed, pressure reciprocated pilot means connected across the stack and having an element movable therein which changes position in response to differential pressure, and linking means connecting said elements to servo-valve units for controlling the actuators in the transmission.

More specifically, the control pump 70 is connected to the engine through its shaft 69 and is of the positive displacement type. Thus, the output of the control pump will be directly proportional to the speed of engine 65. Pressurized fluid from the pump flows via conduit 71 through venturi 72 and conduit 73 to the differential pressure slack 74. The differential pressure stack can be fabricated in a number of ways, but the simplest is the use of two parallel tubes 75 and 76, with tube 75 connected directly to the output of the venturi and a manual valve leading from it to tube 76. A conduit 77 carries the fluid from tube 76 of the stack to reservoir via relief valve 78, or through pressurized line 40 to the relief and replenishing group 47 of the transmission (previously described) from which it is eventually returned to reservoir.

Pressurized fluid from tube 75 passing to tube 76 of the differential pressure stack must pass through the manually-operated speed control valve 79, or an underspeed valve 80, the latter normally being closed when the engine is operating at rated speed. The speed control valve includes a modulating valve spool 81 which is positioned by the manually-manipulated speed lever 82 through linkages 83. Movement of this spool restricts or opens the passage between the tubes of the differential pressure stack. As the restriction increases the pressure in tube 75 will increase above that of tube 76, since the pump flow volume will remain constant at a selected engine speed. Thus, the greater the restriction of the passage by the spool, the greater pressure differential there will be between the two tubes of the stack.

The location of the venturi in the control system is not critical so long as all the control pump flow passes therethrough. It can be located either upstream or downstream of the differential stack since it is responsive to the flow rate from the control pump and cooperates with the underspeed valve 80 to open a parallel path to that controlled by the speed control valve when the engine speed drops off and control pump output decreases.

Basically, underspeed valve 80 is designed to function when the engine falls below its rated speed for which the control system is designed which results in a decrease in output from the control pump 70. When this occurs the pressure in the low-pressure tap 72a of the venturi will increase causing a greater pressure to be reflected in a chamber behind a valve spool 80a containing the spring bias in the underspeed valve. Thus, the pressure from the low-pressure tap of the venturi and the spring bias overcomes the pressure in the inlet throat of the venturi via line 71a reflected on the opposite side of the spool. As long as this pressure exceeds that in the low-pressure venturi tap and the spring 84, the valve spool will be urged into the spring to bottom on a shoulder in the valve body to close off this passage between the tubes of the stack through the underspeed valve. Therefore, decreased output of the control pump due to a reduction in engine r.p.m. will gradually open a flow path between the tubes through the underspeed valve causing the previously established pressure differential in the stack to decrease in proportion to the drop in engine r.p.m. thereby reducing transmission torque requirements until the engine can maintain rated r.p.m. Normally this underspeed valve is set for actuation when the engine speed drops from 3 to 10%, but can be adjusted for a desired sensitivity.

From the above description it should be appreciated that the above elements of the control system can create a pressure differential in two tubes of the stack which is reduced automatically when an underspeed condition exists by the opening of the path through the underspeed valve. By interconnecting pressure responsive means which have elements that move in response to changes in the differential pressure, it is possible to utilize the system to control a hydrostatic transmission. Normally these pressure sensitive elements are connected to servo-control means since they are not generally capable of generating the forces necessary to change the ratio of the transmission.

Typical of such pressure sensitive elements is pump pilot cylinder 90 which controls servo-control arm 41 of the pump servo 37 by a connection to the arm through adjustable linkages 91. Its piston element 92 is centered in the pilot cylinder by springs 93, and the opposite ends of the pilot cylinder are in communication with opposite tubes of the differential pressure stack 74 so that any pressure differential in the stack will be reflected on opposite sides of the piston element. Obviously, some preload to the "centered" position is desirable to insure accurate positioning at zero differential.

Connected in this manner, any pressure differential existing in the stack will cause the piston of the pilot cylinder to be displaced in a direction sufficient to balance the differential against increasing spring bias. It should be appreciated that the pilot cylinder operates on "pressure differential" and thus absolute pressures in the system are not critical.

Since the pump unit is the "reversing unit" of the transmission and reverse the power flow (direction of fluid flow), it is necessary to provide means for reversing the connection of lines 94 and 95 connecting the opposite ends of the pump pilot cylinder to the differential stack to enable its pilot cylinder to operate in both forward and reverse. Forward-reverse valve 96 is used for this purpose, and can switch the connection of line 94 from tube 75 of the differential stack to tube 76 of the differential stack for reversing. Line 95 is simultaneously switched from tube 76 to tube 75, which allows the linkage connecting the piston element to the servo-control arm 41 to properly position the pump for the reverse power flow.

Since the pump pilot cylinder tends to react rapidly to pressure changes in the differential pressure stack, transmission control may be rough unless means are provided to smooth out the rate of movement of the piston element in the pump pilot cylinder. This is accomplished by a parallel ball check and orifice device 97 between the forward and reverse valve and the tubes of the differential pressure stack, as shown in FIG. 1. Since tubes 75 of the differential pressure stack will always be operating at the high pressure when the transmission is running the ball check in the line connecting this tube to the forward-reverse valve is oriented to meter the flow to the valve. This limits the rate of pressure change in the pilot cylinder and thus smooths out movement of its piston element. A similar device incorporated in the connection between valve 96 and tube 76 of the differential stack is reversed so that flow is unrestricted by the ball check from this tube toward the pilot cylinder, but is restricted from the cylinder toward tube 76. Through the above arrangement, the piston in the pilot cylinder will react smoothly for good transmission response.

In the above control system, it should be appreciated that there is essentially no "net" fluid flow required to operate the system since it responds to differential pressure and movement of the pilot cylinder will return the same amount of fluid from one side as is being received by the other so that the net flow is always zero. Thus, actuation of the control system does not result in any pressure fluctuation due to fluid flow demands.

As pointed out above, the transmission is reversed by reversing the power flow (fluid flow) through the pump, and thus the motor 32 will automatically reverse with the change in direction of fluid flow. Thus, motor pilot cylinder 100 is connected directly to the differential pressure stack without a forward-reversing valve. However, the lines 101 and 102 connecting the motor pilot cylinder to the differential pressure stack contain parallel ball check and orifice devices 97 to smooth out the actuation of the motor pilot cylinder in the same manner as described for the pump pilot cylinder. Other modulating means may be employed in place of the ball checks and orifice devices.

As previously noted, the proper sequencing of the transmission requires that the pump 31 be at a maximum displacement in either direction before the displacement of the motor 32 is decreased for increasing the speed of the transmission. This is accomplished in the control system of this invention by a difference in construction in the motor pilot cylinder. Basically, the motor pilot cylinder has a single spring 103 which biases its piston 104 to one end of the cylinder against a stop 104a. The side of the piston without the spring is in communication through line 101 with tube 75 of the differential pressure stack, while the biased side of the piston is in communication with tube 76 of the differential pressure stack via line 102. The motor pilot cylinder has an adjustable linkage 105 connecting its piston to the control arm 44 of the motor servo unit 38.

Using the above construction and proper selection of the spring biasing units in the pump pilot cylinder and motor pilot cylinder, proper control of the transmission can be accomplished by selecting the bias in the motor pilot cylinder so the piston of the pump pilot cylinder will be displaced a maximum in either a forward or reverse direction at a lower pressure differential than is necessary to effect movement of the piston in the motor pilot cylinder against its large spring bias. Thus, as differential pressure in the stack increases, the pressure reflected on the piston of the motor pilot through line 101 will eventually increase sufficiently to move piston 104 against the spring bias and through the linkage with the servo-control arm effect an adjustment of the motor for an increase in speed, after maximum pump displacement.

Through the unique arrangement described above, the transmission will always be properly sequenced by the control system. For example, as the differential pressure in the stack increases from zero, the pump pilot cylinder will be first to react and will be displaced to a maximum prior to the actuation of the motor pilot cylinder which requires a slightly higher pressure for it to react. Thus, proper sequencing from low to high speed and from high to low speed in the transmisison will always be achieved. Also, during all phases of sequencing this novel system, the transmission is automatically adjusted for the power available since the control pump 70 will always reflect engine speed and any decrease in speed will automatically change the differential pressure in the stack through the action of the underspeed valve until the engine can maintain its rated speed, or a close approximation thereof. Therefore, any horsepower demands from the implement pump 67 or other engine-connected units will not lug down the engine since the transmission will automatically reduce vehicle speed until the engine is able to hold its rated speed. This means that the implement circuits will operate more rapidly (higher pump r.p.m.) and that the maximum efficiency as a unit can be obtained from the vehicle using this control system with a hydrostatic transmission.

The basic control system shown in FIG. 1 is designed for an engine running continuously at its rated speed, and in order to provide the basic control system with greater flexibility so that an operator can select various engine speeds below rated, a modified system is shown in FIG. 3. Also, in this design the actuators for controlling the displacement of the pump and motor and the servo units are shown as a linear system. Other than these changes the system is very similar to that shown in FIG. 1 and identical parts are similarly numbered.

In this modified system, to operate the transmission control system below a rated r.p.m., the underspeed valve must be modified since otherwise it would always sense an underspeed condition if constructed as shown in FIG. 1, and prevent the transmission from operating below engine rated speed. A modified underspeed valve 110 is connected across the differential pressure stack 74 so that its control spool 111 can open a path parallel to that controlled by the speed control valve 79, as previously described. However, the spool is connected to a speed pilot cylinder 112 whose piston 113 is spring-centered in the cylinder. This piston has one side in communication with the low-pressure outlet 72a of the venturi 72, and the other side in communication with the inlet of the venturi through line 114. Thus, changes of flow through the venturi will cause the piston to move from a first equilibrium position to a new equilibrium position, moving the spool of the underspeed valve through the linkage. Since any equilibrium condition in the speed pilot cylinder is for a particular speed (flow through the venturi), the bias on the cylinder must be changed for any different engine speed selected so that the underspeed valve will function properly at the selected engine speed. This change in bias is accomplished by spring 115 biasing the spool according to the position of cam 116 connected by linkage 117 to throttle 118. The throttle also acts the governor 119 of the engine and through this arrangement the spring bias on the speed pilot cylinder is adjusted so that the underspeed valve will operate at the speed selected by the throttle rather than at a single preset speed. Through this arrangement the speed control unit can be used for selected engine speeds.

Also, in FIG. 3, the actuator and servo systems are shown as simple linear systems, but the pump pilot cylinder 90 and the motor pilot cylinder 100 are the same and connected to the pressure stack in the same way as those shown in FIG. 1 except the parallel ball check and orifice units 97 are not shown in the lines of the motor pilot cylinder.

Since the operation of the pilot cylinders have been described, it is only necessary to describe the operation of the changed actuator system, shown in FIG. 3 for controlling the transmission. Basically, the pilot cylinders are connected through adjustable links 120, servo spools 121 in their respective actuators 122 and 123. Movement of the servo spools will open one of the ports 124 communicating between the actuator and the servo so that pressurized fluid can flow from line 40 to the actuator causing the housing to move in a direction which will close the port repositioning the housing relative to the servo spool to close the port. The rods 125 of the actuator pistons 126 are secured to the frame and by connecting the housing of the actuator 122 through adjustable linkage 127 to the pump and likewise connecting the housing of actuator 123 through linkage 128 to the motor of the transmission, displacement of the pump and motor can be controlled by the pilot cylinders in the manner previously indicated. The adjustable linkages connecting the actuator housings to the translating units may be used to properly null the transmission for zero speed.

When operating at higher transmission speeds, where the displacement of the motor has been reduced to increase speed, the forward-reverse shift accomplished by valve 96 may not sequence the transmission properly for the best torque ratio characteristics, if the motor pilot cylinder 100 is connected as shown in FIG. 1 in FIG. 3, proper sequencing during a forward-reverse shift at high speed is insured by connecting line 101 of the motor pilot cylinder to the side of the pump pilot cylinder 90, which is at the higher pressure, through a shuttle unit 129.

The spool 129a of this unit has a center land and two smaller outboard lands with grooves in between, so that when the land is centered, line 101 is closed off. When the spool is offset to one side, line 101 will be in communication with one of the grooves. One groove is in communication with line 95 of the pump pilot cylinder, while the other is connected with line 94. Thus, depending on the direction of the displacement of the spool due to the differential area between the center land and the smaller lands at the ends of the spool, one of the pump pilot lines (the line at higher pressure) will be in communication with line 101 of the pump pressure in the motor pilot cylinder. Since the lands at opposite ends of the spool are smaller than the center land, the line operating at the higher pressure will displace the spool so that it establishes communication with line 101 of the motor pilot cylinder.

Connected in this manner, when a forward-reverse shift is accomplished by moving valve 96, the higher pressure sides of both the pump and motor pilot cylinders will flow back to the forward and reverse valve, and thence through the restricting ball check and orifice device 97. Since the motor pilot cylinder requires a much greater pressure to displace it, it will first bleed through the system, holding the pump pilot cylinder at its maximum displacement until it has bled down to bottom out. At this time, the pump pilot cylinder will start to bleed down in order to accomplish a reverse shift. As this has occurred, the higher pressure in the opposite line will begin to reverse the pump pilot cylinder for a reverse power flow, and the spool 129a will shift so fluid pressure will continue to displace the element of the pump pilot cylinder until the pump reaches maximum displacement. In this way, the connection of the motor pilot cylinder is shuttled between lines 94 and 95 of the pump pilot cylinder so that proper sequencing is always insured during a forward-reverse shift.

The center land will close off fluid communication of line 101 with the side of the pump pilot cylinder, changing from the lower pressure to the higher during the forward-reverse shift, until the motor pilot has moved for maximum displacement and the pump pilot has moved for zero displacement, at which time the spool shifts.

Grooves 129b at each end of the shuttle unit are closed by the small lands when the spool is in neutral and communicate with the low pressure side of the stack. Before the spool shifts during a forward-reverse shift, the high pressure from the forward-reverse valve 96 will go directly to the low pressure side of the stack until the pump pilot element moves to zero displacement; at this time, the spool shifts and pressure buildup occurs in both the pump and motor pilots to reverse the transmission. This prevents the higher pressure from working with the bias to position the element of the pump pilot cylinder to a neutral position.

FIG. 4 illustrates how FIGS. 5 and 6 are joined together to show a complete control system for a jointly controlling two separate transmissions 30R and 30L as would be employed in a track-type vehicle. In such a vehicle, steering is effected by driving one track at a different speed in relation to the other, and the control system illustrated provides structures for such a steering capability.

For convenience, the parts of the basic control system and transmissions in FIGS. 5 and 6 are designated the same numerals where identical as used to describe the embodiment shown in FIG. 1. The heart of the control system shown in FIGS. 5 and 6 is very similar to that shown in FIG. 1, with the exception of the additional structures to provide the control system with greater flexibility. Specifically, additional structures are included to provide for steering in track-type vehicles, braking of the vehicle automatically, correcting overspeed and underspeed control, override control for control convenience and other features. Complemented by these additional structures, the basic control system becomes a sophisticated system for controlling hydrostatic transmissions in track-type vehicles which is highly efficient and effective.

Recapping briefly, the differential pressure control system shown in FIGS. 5 and 6 consists of a control pump 70 driven by the engine, a venturi 72, a differential pressure stack 74, a directional valve 96 and pump and motor pilot cylinders 90 and 100, respectively. The above elements are associated in a manner as previously described and function similarly to the system described in FIG. 1, except insofar as the operation of the basic system is effected by the additional components shown. For convenience, the additional components will be discussed separately and their purpose, along with their effect on the operation of the basic system, will be noted.

In the differential pressure stack 74, shown in FIG. 5, there is an additional path between the tubes 75 and 76 controlled by the relief override valve 130. Normally, the spool 131 of this valve is biased to the closed position by spring 132 so that it has no effect on the differential pressure within the stack.

The purpose of the override valve is two fold, in that it provides a safety feature if an overpressure condition develops in the transmission, and also provides a flexible control for the operator. This latter function is accomplished through plunger 133 in the valve body which is actuated by operator foot pedal 134 through linkages 135. By means of the pedal, the operator can effect a reduction of the pressure differential within the stack which has been previously established by setting the speed control lever 82. The spool of this valve has metering slots so that depression of the foot pedal will gradually slow the vehicle from the preselected speed range down to stop within this range as the operator depresses the pedal without using the speed control lever. When the path through the spool is wide open, the differential pressure in the stack will be zero, notwithstanding the setting speed control valve 82.

Cooperating with the relief and override valve 130 is a safety relief cylinder 136 which has its plunger 137 spring-biased to a fixed position within the cylinder body. Orientation of the plunger is such that it will cause the override valve 130 to open if the safety relief cylinder is actuated by high pressure blow-off from the hydrostatic loop. Thus, if an overpressure occurs within the hydrostatic loop, the safety relief cylinder will automatically reduce the differential pressure within the stack, thereby reducing the fluid flow within the hydrostatic loop. This prevents the continuation of power flow through the hydrostatic loop once an overpressure has occurred and prevents a large amount of heat from being generated in the transmission relief system which could result in failure.

In the higher speed ranges of the transmission there is usually not sufficient compression braking to slow the vehicle under some conditions and engine overspeed may occur. For this reason it is desirable to have an overspeed control system 139, as shown in FIG. 5. This overspeed control system also uses the differential pressures available in the basic control system for actuation. Pressure differential developed by the venturi 72 is used to actuate the vehicle brakes to retard it during power generation, such as will occur during vehicle deceleration or downhill operation. During downhill traverse, for example, power generation may occur when the transmission is in the higher speed ranges to the extent that engine compression braking will not be able to control vehicle speed. Under these circumstances, with the motor acting as a pump and the pump as a motor driving the engine, an engine overspeed can occur. The overspeed cylinder 140 uses pressure balancing by connecting line 141 to the low pressure tap 72a of the venturi and reflecting it on one side of piston 142 in the overspeed cylinder. On the opposite side of the piston within the cylinder pressures upstream of the venturi from line 71 are reflected through line 144 and operate against the combined bias of spring 145 and the lower pressure from the venturi tap which normally hold the piston bottomed at one end of the cylinder when no overspeed condition exists. The rod 142a of the piston is connected through linkages 146 to the air brake boost unit 147 which controls the application of the brakes.

During operation of the overspeed system, brake band 148 on brake drum 149 is applied to slow the vehicle during overspeed conditions because the pressure in line 141 will decrease due to increased flow through the venturi because of the higher r.p.m. of the control pump 70, and therefore, the pressure reflected through line 144 will cause the system to actuate the air control unit for retarding the vehicle until the overspeed condition is terminated. Other kinds of control units may be employed.

Another desirable function can be added to the basic control system by incorporating a low speed cut-out valve 155 serially with the underspeed valve 80 in the path between the tubes 75 and 76 of the differential pressure stack 74. Basically, the cut-out valve is designed to give the control system two modes of operation by disabling the underspeed valve at low engine r.p.m. so that the vehicle can be moved with the engine at or near idle. Without this cut-out valve, the underspeed valve would sense an underspeed condition until the engine was operating near rated r.p.m. and prevent the transmission from establishing power flow. Incorporation of this cut-out valve allows the transmission to be operated at or near idle, but without an underspeed control feature. However, in this range underspeed is not a problem.

The cut-out valve is very similar to the underspeed valve but operates in a reverse mode since it closes the parallel path at lower engine speed but remains open at higher engine r.p.m. where underspeed control is necessary. During vehicle operation, low pressure from the low pressure tap 72a of a venturi is reflected on a floating cut-out spool 156 which is biased toward a closed position by spring 157 and this pressure. Reflected on the opposite side of the cut-out spool through line 158 is the pressure from the control pump which above certain selected engine speeds will position the spool to open a flow path through the valve. However, when engine speed is in the area of idle, the pessures from the low pressure tap are higher and, augmented by the spring bias, will close the cut-out valve. In this condition, the speed control valve can be used to create a differential pressure within the stack since the underspeed valve is rendered inoperable even though the engine r.p.m. is not at rated.

As noted above, in dual transmissions for track-type vehicles as shown in FIG. 6, means must be provided in the basic control system to independently control the indvidual transmissions for steering the vehicle. Control of the motors in dual transmission systems is relatively easy with the control system of this invention. Basically, the servo control arms 44 of each motor are slaved together through linkages and controlled by a single motor pilot cylinder 100 so they react in unison. In FIG. 6, special scissor linkage 150 is used to slave the servo control arms of the motors with one another. This linkage has two bell cranks 151 which are pivoted on appropriate supports and linked to the rod 104b of the piston in the motor pilot cylinder so that the bell cranks move together. By this arrangement, the movement of the rod will simultaneously move the servo control arms of the motors an equal amount so equality of track speed on opposite sides of the vehicle will always be maintained so long as fluid input to each motor is the same. Adjustable linkages 152 are used to connect the bell crank and the servo arms in the linkage to allow independent adjustment of the motors so that motor synchronization can be accomplished.

In an embodiment of the control system having a steering capability, as shown in FIG. 6, to control dual transmissions, a single pump pilot cylinder 90 may be employed; and when steering is not being employed, its operation is identical to that described with reference to a single transmission system. However, to incorporate a steering function, it is necessary to connect the pump pilot cylinder to the servo control arms 41 of the pumps through special linkages so that each transmission can be independently controlled or operated jointly. Through the steering linkage 160 shown complementing the basic control system in FIGS. 5 and 6, a greater versatility in steering track-type vehicles is provided since it allows one track to be reversed in a direction relative to the other track while at all times maintaining the tracks in a powered condition.

Specifically, the special steering linkage 160 includes two steering cylinders 161 each mounted on a pivoted base plate 162. A base plate is located close to each of the pumps in the dual transmission system, as can be seen in FIG. 6, and swings about a fixed pivot 163. A protruding lug 164 on each base plate is coupled to a tie rod 165 which spans between the transmissions and ties the lugs together so that the base plates will be swung about their respective pivots in unison. In turn, the tie rod is connected to the pump pilot cylinder 90 which through the tie rod, swings the base plates about their respective pivots in unison. Tie rod 165 includes an adjusting nut 165a by which the respective base plates may be adjusted relative to one another.

Mounted on each base plate is a steering cylinder whose piston rod 166 is oriented to reciprocate across the axis of the pivot 163 of its associated base plate. The travel of the rod is usually restricted to an equal distance on each side of the pivot axis and each rod connected to a piston 167 within its associated steering cylinder. Each piston in turn is held at one end of the cylinder with a spring 168, and the outboard end of its associated rod is connected through a linkage 170 to the servo control arm 41 of the adjacent pump. An adjustment 170a on this linkage is used to adjust the linkage to the pump has zero displacement when the connection between the linkage and the end of the rod is directly over the pivot axis of its base plate.

Once preset to this condition and extended by springs 168, the base plates are swung about their pivots to change the pump displacement of both transmissions an equal amount. Subsequent movement of the rod 166 by cylinder actuation to a point directly over the pivot axis will change the displacement of that pump to zero and further movement of the rod (in the same direction) will carry the connection to the opposite side of the pivot, which increases the displacement of the pump to its prior displacement but with a power flow in a reverse direction. It should be appreciated as the connection of the rod and linkage moves, the base plate remains stationary so that the transmission on the opposite side of the vehicle remains unchanged. The geometry of the linkage can be varied to obtain the correct degree of movement for the servo arms.

Using this arrangement, it is possible to set both transmissions at an equal speed for either a forward or reverse direction through control actuation of the pump pilot cylinder and thereafter by actuation of the steering cylinder associated with one of the transmissions to independently slow that transmission and reverse it to the same speed but in the opposite direction. By increasing the fluid pressure in a steering cylinder sufficiently the requisite movement of the rod can be effected for such steering operations. The specific linkage described is very desirable since it operates in either a forward or reverse direction without the necessity of complicated reversing valves or the like.

The full steering linkage is illustrated in FIG. 10 wherein a bridge valve 175 is shown for controlling the pressure flow to the individual steering cylinders. The bridge valve is really two valves in one which has a pair of identical spools joined endwise in the single spool 176. The spool is spring-centered by springs 177 at one end and can be attached to various means for operating it at the other.

The bridge valve has a central port which is connected to a source of pressure fluid, such as line 40. Fluid pressure entering the valve is routed to a groove 179 and confined by a land on the spool 176 when it is centered by its centering springs. Movement of the valve to the right or left first brings one or the other set of small flow orifices 180 into communication with the pressure fluid so that it begins to flow from the central groove toward one or the other drain grooves 181. Further movement of the spool in the same direction will bring larger slots 182 into communication with the central groove so that the flow will be increased. As this is occurring another portion of the valve spool is simultaneously closing off the drain groove with similar passages and slots 180a and 182a. This causes pressure to build gradually in one of the ports 183 between the central groove and one of the drain grooves. These ports are connected to opposite steering cylinders 161 through lines 184.

The above bridge system is schematically displayed in FIG. 11, and FIG. 12 is a pressure profile developed by the use of the orifice and bleed slots arrangement described above. It can be seen from the pressure profile 185 that the initial movement of the valve builds the pressure up rather sharply to a steering point and thereafter continued movement of the spool gradually increases the steering pressure up to the point that the travel of the rod of one of the steering cylinders begins to reverse the power flow in its associated pump. This is the point where the reversal of tracks begins. In this manner, excellent steering response is achieved with a simple, economical system which provides a maximum flexibility. The spool in the bridge valve may be controlled by any suitable means such as a wheel, lever, etc.

A simple steering valve 175 is shown in FIG. 5 and actuated by a lever 186 connected to its spool. Lines 184 connecting the valve to the steering cylinders include a parallel ball check and orifice unit 188 which smooth out the steering if desired.

In FIG. 11, the steering circuit just described is schematically illustrated. In this particular embodiment, the ports and slots 180, 180a, 182 and 182a must provide the pressure profile as shown in FIG. 12.

In FIG. 7, dual transmissions in a track-type vehicle 190 are illustrated for a better understanding of the above descriptions. Transmissions 30R and 30L are mounted in the vehicle in a side-by-side relationship and some of the actuators and other control hardware are also shown by way of illustration. The pumps 31 of the transmissions are driven from a common driveshaft 192 by a bull gear 193 and gears 194. This arrangement allows power regeneration to be interchanged between the transmissions through the common bull gear. Further, no clutch is necessary since the displacement of the pump in each transmission can be adjusted to zero and power flow in the transmission stopped. Also, since the novel control system is controlled by fluid pressures, the operator station can be located remote from the transmission and control system.

Since the transmissions discussed above do not have a clutch between their pumps and the engine, there is a possibility that the vehicle may be started "in gear," i.e., with the speed control lever at "go" position. Thus, if the operator starts the engine, the vehicle may undergo unexpected movement, creating a safety hazard. For this reason, it is desirable to incorporate safety features in the control system which prevent unwanted movement on "start up." In FIG. 8, an improved relief and replenishing group 47a is shown in a single housing 200 which provides "start up" safety features, as well as the dual functioning elements which are an improvement over the prior art group shown in FIG. 2.

The replenishing section 201 of the housing 200 includes a cylindrical chamber 202 which has communication with pressurized line 40 and is closed by poppet spools 203 at opposite ends. Each poppet spool has a stepped head 203a arranged so that the stepped surface 203b has communication with an annular recess 204 in the housing which, in turn, communicates through port 205 with one of the conduits in the hydrostatic group, so that one annular recess at one end of the chamber has communication with conduit 33 while the other recess communicates with conduit 34.

Springs 206 urge the heads of the poppet spools into chamber 202 where they seat to close the chamber. The bias of the springs is such that the pressurized fluid in line 40 will overcome it, depressing the poppet spools and allow fluid to flow into the hydrostatic loop to replenish it with cool hydraulic fluid.

During power flow in the transmission, one of the conduits will be operating at a high pressure in order to transmit power from the pump to the motor, and this higher pressure is reflected via port 205, recess 204 and through orifice 207 into a balance chamber 208 behind the poppet spool which will allow pressures to equalize so the poppet spool can move out of the balance chamber under the influence of the spring closing off flow through the replenishing section from the high pressure side of the loop.

In the replenishing section shown in FIG. 8, the balance chambers are vented to reservoir through a channel 208a which is closed by a ball valve 209. It can be appreciated that unless the ball valve is seated, it will not be possible to operate the transmission since the fluid can bypass the motor through the poppets as described above. The ball valve is seated by directing pressurized fluid via line 213 to plunger 214 whose stem portions bear on the ball valves causing them to seat and close the vent to reservoir. Ball valve 209 may be replaced with other valve types.

In turn, the safety-reset valve controls the flow of pressurized fluid to the plungers and prevents the transmission from being actuated until the operator effects a manipulation in the safety system.

The safety-reset valve 220 is shown in FIG. 9 and when the transmission is "reset" pressurizes line 213 through port 221 so that the plungers will close the ball valves in the replenishing section of housing 200, thereby activating the transmission.

If the park lever (not shown) is released to the "off position," link 222 will release spool 223 in the housing allowing spring 224 to urge the spool to a position which will open a flow path from pressurized line 40 through port 225 into port 226 where the pressurized fluid can pass via ball check 227 to the reset spool 228. The reset spool in turn controls the passage of the pressurized fluid to port 221 from which it is carried to the plungers in the replenishing group for activating the transmission.

Construction of the reset spool is such that land 229 closes off port 221 until the spool is moved into spring 230 sufficiently to establish fluid communication between the ball check and this port. When the transmission is disabled, the reset spool will have the position shown in FIG. 9 so that pressurized fluid passing the ball check can, through orifice 231, pass into chamber 232 by land 233. A bleed port 234 in the spool bleeds chamber 232 to reservoir when the spool is in the safety position, as can be seen in the drawing. In operation, after the park lever is released and spool 223 opens a flow path of pressurized fluid to ball check 227, the reset spool can be pushed into its spring which will cause passage 234 to be closed by the valve body and allow fluid pressure passing the ball check and acting on land 233 to hold the reset spool against the spring bias. In this position, it allows the pressurized fluid to pass into the port 221. The reset spool is generally located adjacent to the speed control lever and oriented so that when the speed control lever is returned to the "stop" position, it will depress the spool which will be then held by fluid pressure in the "on" position, providing the park lever is released.

To prevent hydraulically holding the reset spool in the activated position once set through a hydraulic lock, chamber 232 is bled through port 235 via metering valve 236 to reservoir, which will allow the fluid trapped in chamber 232 to bleed slowly to reservoir, thereby allowing the reset spool to move under the spring pressure to open the chamber to reservoir and disable the transmission when fluid flow to the spool falls below the quantity being bled from the chamber. This would normally occur on shut down or placement of the park lever in the "on" position. In this way, the transmission is disabled until the park lever is released and the spood control lever is returned to "stop." This provides a very desirable safety feature for hydrostatic transmissions and this safety feature will eliminate some of the hazards that will be present due to the operator's unfamiliarity with a hydrostatic type of transmission system in track-type vehicles.

The vent and overpressure relief functions are also combined in the housing 200 shown in FIG. 8 in the vent overpressure section 240. This section has a master chamber 241 which is divided into two secondary chambers by a shuttle piston 242 which is free to reciprocate between the chambers, but prevents fluid communication therebetween. One of the secondary chambers 241a is connected through its port 243 to conduit 33 and the other secondary chamber through its port 233 is connected to conduit 34. Located at each end of the master chamber are poppet valves 246 which close ports 247 at opposite ends of the master chamber therefrom. These ports lead via passage 248 to reservoir. Each poppet valve is biased by a spring 249 to close the communication between its associated port and secondary chamber. Behind each poppet valve is a balance chamber 250 which drains to reservoir via port 251, which in turn is closed by a spring-loaded poppet 252. Each poppet valve has an orifice 253 in its face so that the pressure in the secondary chambers can pass through the orifice to the balance chamber to equalize pressures.

Utilizing the above construction, when the transmission is activated, the vent and overpressure valve will function in the following manner. The pressure from either conduit 33 or 34, the one operated at the higher pressure, will enter one of the secondary chambers 241a through port 243 and cause the shuttle spool to move into the opposite secondary chamber. As this occurs, a nose piece 242a on the end of the shuttle piston will engage the face of the poppet valve 246 depressing it and open the lower pressure conduit through ports 243 and 247 and via coolers and relief valves to reservoir so that additional fluid will be removed from the low pressure side of the hydrostatic loop so additional fluid can be added for cooling. The opposite poppet then becomes the high pressure relief overpressure valve since high pressure fluid in its secondary chamber may enter the balance chamber behind its poppet valve and, with the assistance of the spring, hold this poppet valve closed as long as the pressure in the balance chamber does not exceed the spring bias on the small poppet 252. Should the latter occur, high pressure fluid will be vented from the balance chamber into ports 254 to the high pressure override cylinder 126 (see FIG. 5) via line 255 and the poppet valve will dump to the opposite conduit (33 or 34) through passage 248.

During the above description of the basic control system, mention was made of parallel ball check and orifice units 97 which were used to smooth out the operation of the control system so that abrupt changes in setting would not be accompanied with violent transmission response. While the parallel ball and orifice units do smooth the transmission response, the rate of response varies in proportion to the differential pressure established in the stack 74. For this reason, it is desirable to use a variable orifice device 270, shown in FIG. 13. The variable orifice device includes a housing 271 having a bore 272 therein. Reciprocably mounted within this bore is a spool 273 that has a land at both ends and a reduced diameter center portion. In the area of reduced center portion, a plurality of radial orifices 274 is drilled in generally axial alignment so that as the spool moves within the bore against the bias of spring 275, one of its lands 273a will serially close the orifices and thereby restrict fluid flow from the bore to chamber 276. Fluid is supplied to the bore between the lands of the spool via an axial passage 277 in the spool which extends from one end thereof and vents into bore 272 between the lands. By this arrangement, fluid pressure entering the unit via port 278 can pass through the axial passages and thence through the orifices to chamber 276. Spring 275 biasing the spool 273 to keep the orifices open is located in a balance chamber whose port 279 is in communication with tube 76 of the differential pressure stack.

Utilizing this unit, it is possible to give the control system a smooth response over its full range independent of the differential pressure developed in the stack.

By way of illustration, reference is made to FIG. 1 wherein the ball check and parallel orifice device 97 may be disconnected from line 101 and this line in turn connected to chamber 276 with port 278 connected directly to tube 75 of the differential pressure stack. Connected in this manner, the greater the pressure differential in port 278 to that in port 279, the more the spool will move into spring 275, closing off more and more of the orifices 274. Thus, at higher differential pressures, fewer orifices will be available for the transmission of hydraulic fluid to the pump pilot cylinder 90. Conversely at lower differential pressures more of the orifice passages will be exposed and response will tend to be uniform throughout the control range. As the differential pressure is reduced and reverse flow through the unit occurs, spring 275 will displace the spool so that all the orifices are open from chamber 276 to port 278, so that in effect it operates like the check valve.

Utilizing these differential orifice devices which, like many of the components of the control system, are based on differential pressure principles, it is possible to give the basic control system smooth response throughout its entire control range so that operator comfort and safety will be maintained. Also, it should be appreciated when the variable orifice units are connected in the control system, port 278 will be in communication with either the high pressure tube 75 of the differential pressure stack, or tubes 95 and 102 of the pump pilot cylinder and motor pilot cylinder, respectively. This can be appreciated by noting the orientation of the ball and check device 97 in FIG. 1 for which variable orifice units 270 are substituted in the refined version of the control system or other means.

An alternative embodiment of the differential orifice device can be fabricated by locating port 276 so that it has direct communication with bore 272 in the area of the reduced portion of the spool 273 and deleting the axial passage 277 in the spool. In this embodiment one end of the spool is connected with one side of the pilot cylinder and the opposite end of the spool is connected with the other side of the pilot cylinder being modulated. Connected in this manner the unit provides additional modulation since the fluid passing to or from the pilot cylinder through port 278 is modulated in proportion to the pressures on the opposite sides of the pilot cylinder.

In the drawings, R is used to refere to a common reservoir.

What is claimed is:

1. A steering control system for controlling paired hydrostatic transmissions in crawler-type vehicles and the like wherein said transmissions are driven by a common prime mover and independently controlled for steering by changing the displacement of the variable displacement pump including a control servo in each transmission comprising:
   pivoted support means located adjacent to each hydrostatic transmission;
   a tie rod between said support means coupling them for simultaneous swingable movement about their respective pivots;
   a steering cylinder having a reciprocating element fixedly mounted on each said support means so said element reciprocates across the pivot axis of its associated support;
   links connecting each said element to its associated transmission pump control servo so that movement of said support means will simultaneously adjust the servos of both said transmissions and independent movement of each element will independently control its associated transmission; and
   actuating means for independently controlling each steering cylinder for steering by changing the speed of one transmission relative to the other.

2. A steering control system as defined in claim 1 wherein the actuating means for controlling the cylinder means includes a valve means for directing fluid pressure to the steering cylinder to effect a change in the position of their reciprocating elements and spring means biasing said elements to a fixed position when fluid pressure is not applied thereto through said valve means.

3. The steering control system as defined in claim 2 wherein said valve means includes variable flow passages so that steering reaction has a prescribed relationship to the operator's actuation of said valve means.

References Cited
UNITED STATES PATENTS

| | | | |
|---|---|---|---|
| 3,065,700 | 11/1962 | Blenkle | 180—6.48 |
| 3,161,245 | 12/1964 | Thoma | 180—6.48 |

LEO FRIAGLIA, Primary Examiner

J. A. PEKAR, Assistant Examiner

U.S. Cl. X.R.

60—52

PO-1050
(5/69)

UNITED STATES PATENT OFFICE
CERTIFICATE OF CORRECTION

Patent No. 3,526,288     Dated September 1, 1970

Inventor(s) John R. Cryder, et al

It is certified that error appears in the above-identified patent and that said Letters Patent are hereby corrected as shown below:

Page 1, Column 1, line 9, "Vanzandt" should be --Van Zandt--

SIGNED AND
SEALED
NOV 24 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,526,288　　　　　　　　　Dated September 1, 1970

Inventor(s) J. R. Cryder et al

It is certified that error appears in the above-identified patent and that said Letters Patent are hereby corrected as shown below:

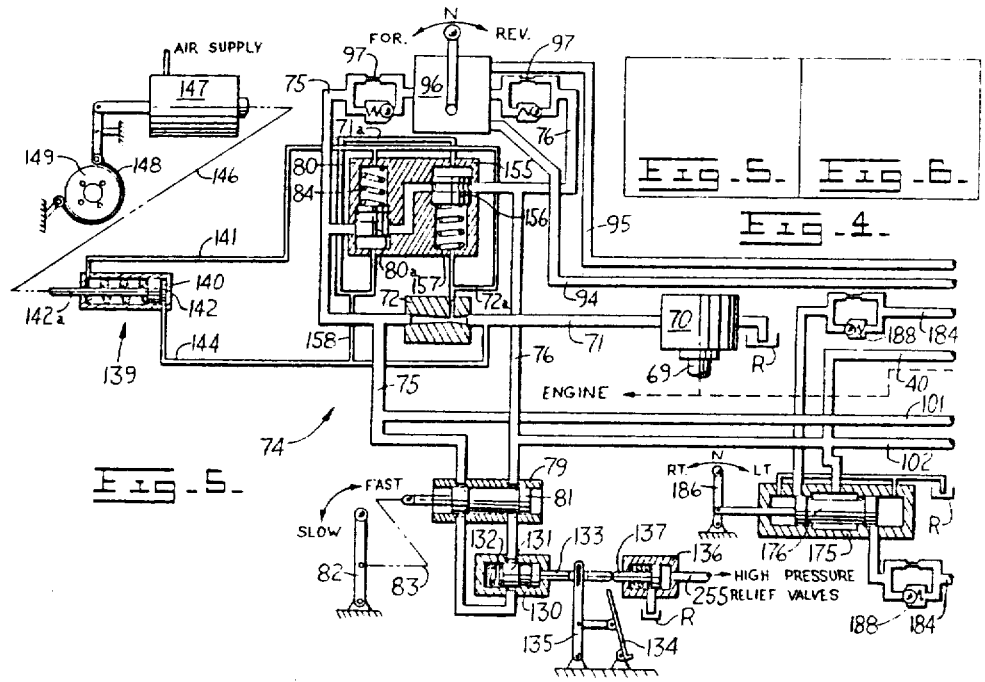

Signed and Sealed this

Twenty-seventh Day of June 1978

[SEAL]

Attest:

RUTH C. MASON
Attesting Officer

DONALD W. BANNER
Commissioner of Patents and Trademarks